UNITED STATES PATENT OFFICE.

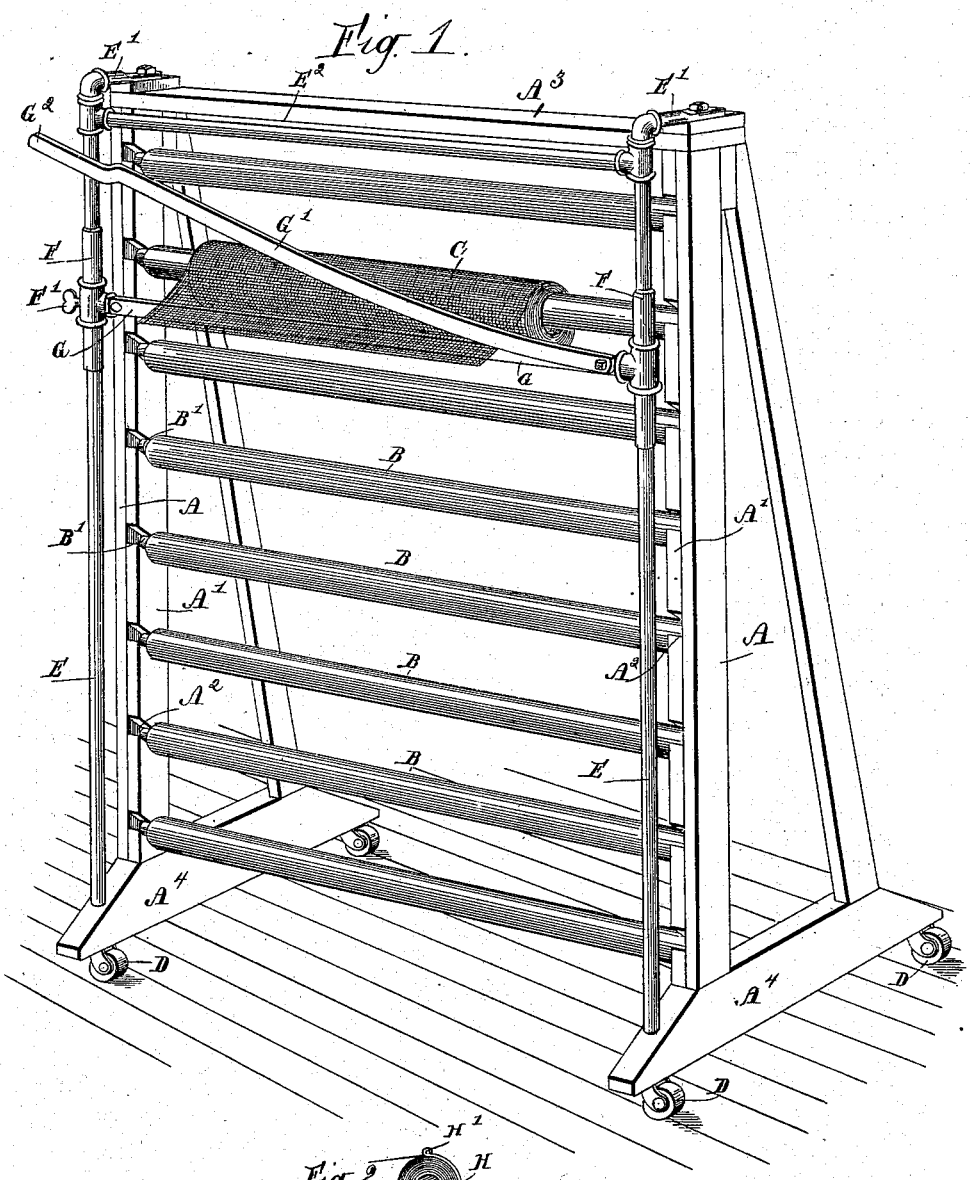

GEORGE W. REYNOLDSON, OF MANSON, IOWA.

SCREEN-WIRE RACK.

SPECIFICATION forming part of Letters Patent No. 654,671, dated July 31, 1900.

Application filed May 19, 1900. Serial No. 17,306. (No model.)

*To all whom it may concern:*

Be it known that I, GEORGE W. REYNOLDSON, a citizen of the United States, residing at Manson, in the county of Calhoun and State of Iowa, have invented certain new and useful Improvements in Screen-Wire Racks; and I do hereby declare the following to be a full, clear, and exact description of the invention, such as will enable others skilled in the art to which it appertains to make and use the same.

The object of this invention is to produce a simple and convenient device for the exhibition and manipulation of window-screen wire in hardware and other stores.

The nature of the invention will fully appear from the description and claims following, reference being had to the accompanying drawings, in which—

Figure 1 is a view of a device embodying my invention in perspective, and Fig. 2 is an end view of one of the rolls with a spring-clamp thereon.

Similar letters of reference indicate corresponding parts.

A is a frame having standards $A'$, provided with suitable notches $A^2$ to take the trunnions $B'$ of rollers B to receive the rolls of screen-wire C, of which but a single roll is illustrated. A cross-bar $A^3$ connects the frame at the top, and its bases $A^4$ are preferably provided with casters D, by which the whole apparatus may be easily moved from one place to another. In front of the standards are vertical guides E, the lower ends of which are stepped in the bases $A^4$, and the upper ends connect with the top of the frame by right-angled arms $E'$. They should also be connected with each other by a cross-rod $E^2$ to keep the guides always parallel and in proper position. The guides and their connections may be made of gas pipe and fittings, as shown. On the guides are mounted thimbles or sleeves F, and to these are connected a shear-blade G. A shear-blade $G'$, having a handle $G^2$, is pivoted to the former blade and serves for cutting the wire-netting as reeled off the rolls. The whole shear, with its connected guide-sleeves, is movable up and down on the guides and is secured opposite any desired roll of wire by means of a thumb-screw $F'$. To hold the rolls neatly in place and prevent the material of one roll interfering with another, a spring-clasp H is provided, as shown in Fig. 2. This may be of spring-wire bent to substantially the form shown—that is to say, with terminal eyes $H'$ and a central coil $H^2$—and in use is slipped over the roll in the manner shown and follows it as the material is unrolled. By this means screen-wire is kept in a neat and orderly condition with economy of floor-space and may be easily and quickly moved from one part of the store to another, as circumstances may require. It also gives the greatest facility and convenience in measuring off and cutting the wire for purchasers.

Having thus described my invention, what I claim as new, and desire to secure by Letters Patent, is—

1. In a screen-wire rack, the combination of a pair of standards having bearing for a series of rolls therein, a series of screen-holding rolls mounted in said bearings, guides adjacent to said standards, a shear mounted movably on said guides, and means for securing the same in any desired position.

2. In a screen-wire rack, the combination of a frame having a pair of standards with roll-bearings therein, a series of rolls mounted in said bearings, a pair of parallel guide-rods adjacent to the standards, sleeves mounted on said guide-rods, with means for fastening them at any point, and a pair of shears connected to said sleeves.

3. The described rack for window-screen wire, comprising a frame having roll-holding standards, a connecting cross-bar and bases provided with casters, a pair of parallel guide-rods stepped in the bases at their lower ends and connected to the top of the frame by a right-angled arm, a connecting cross-rod, a pair of sleeves mounted to run on said guides, means for securing them at any desired point, and a shear secured to both sleeves, substantially as and for the purpose set forth.

In testimony whereof I affix my signature in presence of two witnesses.

GEORGE W. REYNOLDSON.

Witnesses:
J. P. HOLBROOK,
G. S. MOREAU.